United States Patent
Sweers et al.

(10) Patent No.: US 6,991,279 B2
(45) Date of Patent: Jan. 31, 2006

(54) REINFORCED DOOR TRIM PANEL

(75) Inventors: Michael John Sweers, Williamston, MI (US); Yoichi Sato, Farmington Hills, MI (US); Mark Alan DeJongh, Ypsilanti, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 9 days.

(21) Appl. No.: 10/801,774

(22) Filed: Mar. 16, 2004

(65) Prior Publication Data

US 2005/0206193 A1   Sep. 22, 2005

(51) Int. Cl.
*B60J 5/00* (2006.01)
(52) U.S. Cl. .................................... 296/146.7
(58) Field of Classification Search ............ 296/146.7, 296/146.5, 146.6; 49/502
See application file for complete search history.

(56) References Cited

U.S. PATENT DOCUMENTS

| | | | | |
|---|---|---|---|---|
| 5,419,606 A | * | 5/1995 | Hull et al. ............... | 296/146.7 |
| 5,932,331 A | * | 8/1999 | Jones et al. .............. | 296/146.7 |
| 6,196,607 B1 | * | 3/2001 | Gulisano ................. | 296/146.7 |
| 6,616,216 B2 | * | 9/2003 | Furuyama et al. ....... | 296/146.7 |
| 6,857,688 B2 | * | 2/2005 | Morrison et al. ........ | 296/146.7 |
| 2001/0025456 A1 | * | 10/2001 | Furuyama et al. ....... | 296/146.7 |
| 2002/0027376 A1 | * | 3/2002 | Marcovecchio et al. . | 296/146.7 |
| 2002/0047289 A1 | * | 4/2002 | Furuyama et al. ....... | 296/146.7 |
| 2003/0011209 A1 | * | 1/2003 | Berta et al. ............. | 296/146.7 |
| 2003/0116993 A1 | * | 6/2003 | Skarb et al. ............ | 296/146.7 |

FOREIGN PATENT DOCUMENTS

| | | |
|---|---|---|
| JP | 05-193433 | 3/1993 |
| JP | 05-162598 | 6/1993 |

* cited by examiner

*Primary Examiner*—Lori L. Coletta
(74) *Attorney, Agent, or Firm*—Gifford, Krass, Groh, Sprinkle, Anderson & Citkowski, PC

(57) ABSTRACT

A reinforced trim panel assembly secured to a body panel for a vehicle includes a first trim panel member adjacent to a second trim panel member along a first seam. A reinforcement bracket is disposed between the trim panel members and the vehicle body panels, and is positioned over the first seam and secured to each of the first trim panel member and the second trim panel member using a fastening means. The reinforcement bracket absorbs a force from an impact to the trim panel assembly to prevent separation of the first seam.

14 Claims, 1 Drawing Sheet

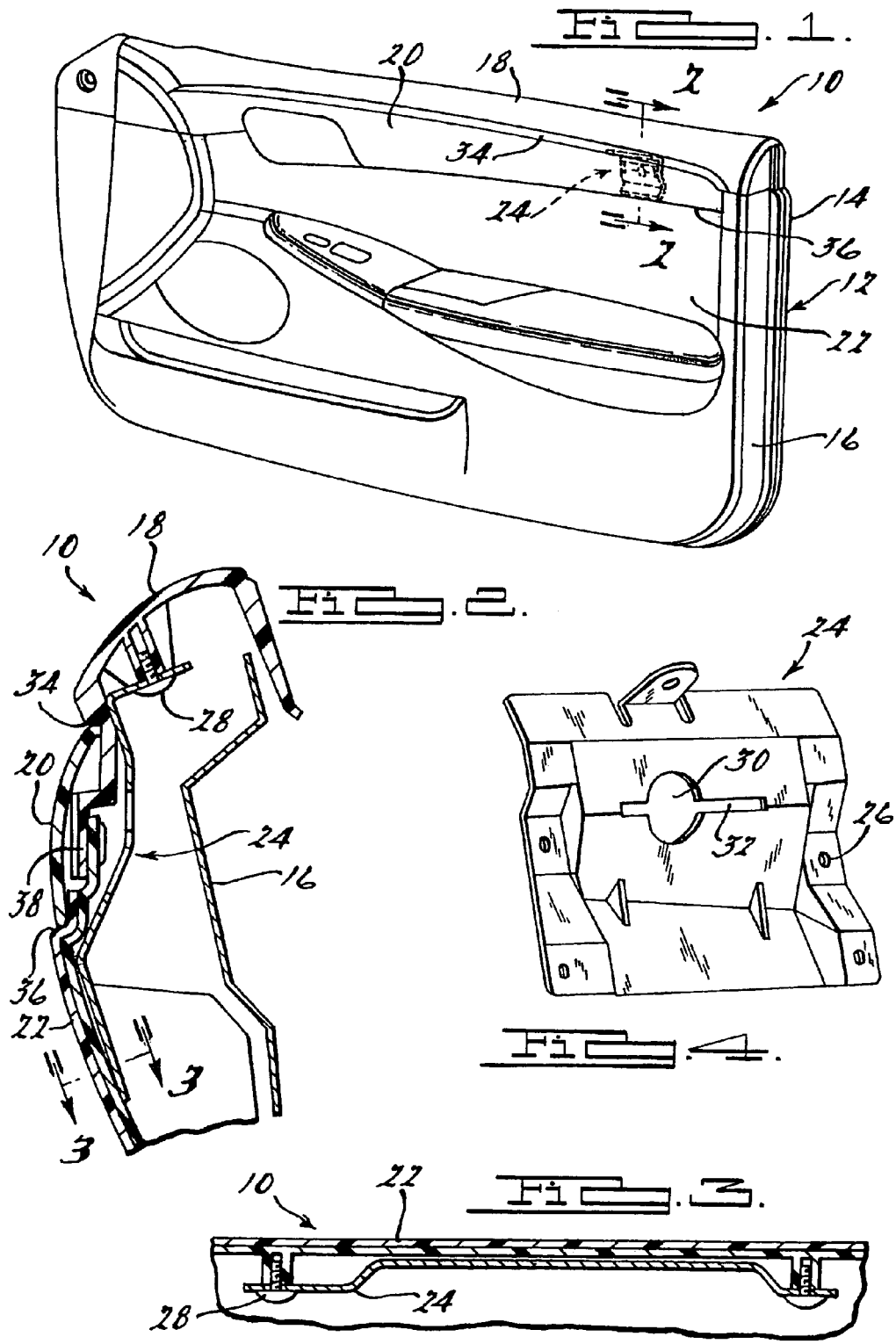

REINFORCED DOOR TRIM PANEL

BACKGROUND OF THE INVENTION

1. Field of the Invention

The present invention relates generally to an interior trim panel for a vehicle and, more specifically, to a reinforced door trim panel for a vehicle.

2. Description of the Related Art

The interior of vehicles, such as motor vehicles, typically include various trim panels that provide an aesthetically pleasing appearance to the interior structure of the vehicle. Each trim panel may be an assembly of several trim components joined together to achieve the desired appearance. For example, a door trim panel is mounted to the door frame to enhance and customize the interior of the vehicle. In addition to the aesthetic function of the door trim panel, it may also offer protection to an occupant of the vehicle, should the occupant come in contact with the door trim panel.

At the same time, it is known in the art to provide an inflatable restraint system, also referred to as an air bag system, in the vehicle to supplement the protection traditionally offered by a seat belt. The air bag system is positioned in the interior of the vehicle, so that it is in close proximity to an occupant, including the driver or a passenger. The air bag system includes an air bag module located within the vehicle structure and having an air bag, which is deployed through an opening in the structure, to restrain movement of the occupant and protect the occupant from forcefully striking a portion of the vehicle interior as result of an applied force to the vehicle. More recently, side air bags have been incorporated into vehicles to protect the vehicle occupant from a force applied to the side of the vehicle. The side airbag is housed in a side structure of the vehicle, such as the vehicle seat. Deployment of the side airbag may result in the application of a force to the door trim panel, and this application of force may induce undesirable movement of the individual trim panel components in a trim panel assembly. In the past, one of the trim panel components included a longitudinally extending channel along a lower edge where two trim panel components meet, to prevent undesirable movement of the individual trim panel components relative to one another. While this method works, it may detract from the desired functional or aesthetic appearance of the trim panel assembly.

Thus there is a need in the art for a reinforced trim panel assembly that transfers the energy from an applied force back into the trim panel assembly, while at the same time maintaining the desired structural integrity of the trim panel assembly.

SUMMARY OF THE INVENTION

Accordingly, the present invention is a reinforced trim panel assembly for a vehicle body panel. The reinforced trim panel assembly includes a first trim panel member adjacent to a second trim panel member along a first seam. A reinforcement bracket is disposed between the trim panel members and the vehicle body panel positioned over the first seam and secured to each of the first trim panel member and the second trim panel member using a fastening means. The reinforcement bracket absorbs a force from an impact to the trim panel assembly to prevent separation of the first seam.

One advantage of the present invention is that a reinforced trim panel assembly is provided with increased structural strength. Another advantage of the present invention is that a reinforced trim panel assembly is provided that maintains its structural integrity upon the application of a predetermined force. Still another advantage of the present invention is that a reinforced trim panel assembly is provided that allows the energy of the applied force to be transferred back into the trim panel assembly. A further advantage of the present invention is that a reinforced trim panel assembly is provided that provides increased protection for an occupant during a side impact condition resulting in deployment of a side air bag.

Other features and advantages of the present invention will be readily appreciated, as the same becomes better understood after reading the subsequent description taken in conjunction with the accompanying drawings.

BRIEF DESCRIPTION OF THE DRAWINGS

FIG. 1 is a perspective view of a view of a door trim panel assembly, according to the present invention.

FIG. 2 is a sectional view taken along line 2—2, of the door trim panel assembly of FIG. 1, according to the present invention.

FIG. 3 is a sectional view taken along line 3—3, of the door trim panel assembly of FIG. 1, according to the present invention.

FIG. 4 is an elevational view of the reinforcement bracket for the door trim panel assembly of FIG. 1, according to the present invention.

DESCRIPTION OF THE PREFERRED EMBODIMENT(S)

Referring to the drawings, and in particular FIGS. 1–4, one embodiment of a reinforced trim panel assembly 10 for a vehicle is illustrated. It should be appreciated that in this example, the trim panel assembly 10 is for the door 12 of the vehicle, although trim panels for other vehicle structural components are contemplated, such as a pillar or a fender or the like.

The vehicle door 12 includes an outer body panel 14 joined to an inner body panel 16. The outer panel 14 and inner panel 16 are made from a metal material, such as steel. The trim panel assembly 10 is operatively attached to the door panels using a fastening means, such as a screw or bolt or the like.

The trim panel assembly 10 includes a plurality of trim members joined together to form an integral trim panel unit. It should be appreciated that the interior-facing side of the trim panel assembly 10 is viewed from the occupant compartment of the vehicle, and may be decorative in appearance. The trim panel assembly 10 can be made from a variety of materials, including metal, plastic, fabric, or a combination of materials, to achieve the desired function or appearance.

The trim panel assembly 10 includes a first trim panel member 18 which is generally planar, and extends longitudinally and vertically. The trim panel assembly 10 includes a second trim panel member 20 which is adjacent a lower edge of the first trim panel member 18. The second trim panel member is also generally planar, and extends longitudinally and vertically. In this example, the trim panel assembly further includes a third trim panel member 22 which is adjacent a lower edge of the second trim panel member 20. The third trim panel member 22 is also generally planar, and extends longitudinally and vertically. It should be appreciated that each of the first trim panel member 18, second trim panel member 20 and third trim panel member 22 are joined together using a joining means to form an integral panel member, such as by bonding or gluing or heat staking or a fastener or the like. In this example, the first and third trim panel member 18, 22 are joined together, and the second trim panel member 20 is positioned over the joint seam between the first and third trim panel members, as shown at 38.

The trim panel assembly 10 also includes a reinforcement bracket 24 secured to the back side of the co-joined first trim panel member 18, second trim panel member 20 and third trim panel member 22. The reinforcement bracket 24 is generally planar, and shaped to conform to the shape of the cojoined first trim panel member 18, second trim panel member 20 and third trim panel member 22. The reinforcement bracket 24 includes a plurality of apertures 26 for attaching the reinforcement bracket 24 to the each one of the co-joined first trim panel member 18, second trim panel member 20 and third trim panel member 22 using a fastening means 28, such as a screw. The reinforcement bracket 24 is attached to each one of the trim panel members 18, 20, or 22 in order to better distribute any force directed to the trim panel assembly 10.

The reinforcement bracket 24 also includes an energy absorption aperture 30. This aperture 30 is positioned in the center of the bracket and is generally circular, with a horizontally oriented slot 32 bisecting the center of the aperture 30. The size and position of the energy absorption aperture 30 is selected to according to the desired amount of energy absorption of the reinforcement bracket 24. For example, the larger the aperture 30, the likelihood that the reinforcement bracket 24 will crush due to the application of a force increases and the amount of energy that it will absorb decreases.

A factor in selecting the overall size of the reinforcement bracket 24 is to ensure that that it can be simultaneously attached to each of the trim panel members. Another factor is to ensure that at least a portion of a first seam 34 located between the first trim panel member 18 and second trim panel member 20, and a second seam 36 located between the second trim panel member 20 and third trim panel member 22 are each covered by a predetermined amount. In this example, the reinforcement bracket 24 extends longitudinally to cover the seams 34, 36 approximately the distance that the deployed side air bag would come in contact with the trim panel assembly 10.

The trim panel assembly 10 may include other integrally formed features, such as a door handle, or a storage compartment or the like. While this embodiment has been described with respect to three trim panel members, greater or fewer cojoined trim panel members are contemplated, and the reinforcement bracket would partially cover each of the seams between co-joined members. In addition, it is contemplated that each of the trim panel members can be oriented horizontally, vertically or in any desired combination to provide the desired appearance and function.

Advantageously, the deployment of a side air bag will direct a force on the trim panel assembly 10 that is absorbed by the trim panel members and the reinforcement bracket 24 and will not result in a separation of any of the seams 34, 36 or 38 between any one the trim panel members 18, 20, 22.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A reinforced trim panel assembly for a vehicle body panel comprising:
   a first trim panel member adjacent to a second trim panel member along a first seam; and
   a reinforcement bracket disposed between said trim panel members and the vehicle body panel, wherein said reinforcement bracket is positioned over said first seam and secured to a back side of each of said first trim panel member and said second trim panel member to absorb a force from an impact to said trim panel members to prevent separation of said first seam.

2. The reinforced trim panel assembly as set forth in claim 1 wherein said first trim panel member is generally planar and extends vertically and longitudinally a predetermined distance, and said second trim panel member is generally planar and extends vertically and longitudinally a predetermined distance.

3. The reinforced trim panel assembly as set forth in claim 1 wherein said reinforcement bracket is generally planar and has a shape corresponding to the shape of said integral first trim panel member and said second trim panel member, and also extends longitudinally and vertically a predetermined distance, so that at least a portion of said first seam is covered by said reinforcement bracket.

4. A reinforced trim panel assembly for a vehicle body panel comprising:
   a first trim panel member adjacent to a second trim panel member along a first seam; and
   a reinforcement bracket disposed between said trim panel members and the vehicle body panel, wherein said reinforcement bracket is positioned over said first seam and secured to a back side of each of said first trim panel member and said second trim panel member to absorb a force from an impact to said trim panel members to prevent separation of said first seam;
   wherein said reinforcement bracket includes an energy absorption aperture for absorbing energy applied to said reinforcement bracket.

5. The reinforced trim panel assembly as set forth in claim 4, wherein said energy absorbing aperture includes a longitudinally extending slot bisecting said energy absorption aperture.

6. The reinforced trim panel as set forth in claim 4 wherein a fastening means is used to secure said reinforcement bracket to said first trim panel member and said second trim panel member.

7. A reinforced trim panel assembly attached to a body panel of a vehicle comprising:
   a first trim panel member that is generally planar and extends vertically and longitudinally a predetermined distance;
   second trim panel member adjacent to said first trim panel member along a first seam, and said second trim panel member is generally planar and extends vertically and longitudinally a predetermined distance; and
   a reinforcement bracket disposed between said trim panel members and the vehicle body panel, and positioned over said first seam and secured to a back side of each of said first trim panel member and said second trim panel member, wherein said reinforcement bracket is generally planar and has a shape corresponding to the shape of said first trim panel member and said second trim panel member, and also extends longitudinally and vertically a predetermined distance, so that at least a portion of said first seam is covered by said reinforcement bracket, and said reinforcement bracket absorbs a force from an impact to said trim panel members to prevent separation of said first seam.

8. A reinforced trim panel assembly attached to a body panel of a vehicle comprising:
   a first trim panel member that is generally planar and extends vertically and longitudinally a predetermined distance;
   second trim panel member adjacent to said first trim panel member along a first seam, and said second trim panel member is generally planar and extends vertically and longitudinally a predetermined distance; and
   a reinforcement bracket disposed between said trim panel members and the vehicle body panel, and positioned over said first seam and secured to a back side of each of said first trim panel member and said second trim panel member, wherein said reinforcement bracket is generally planar and has a shave corresponding to the shave of said first trim panel member and said second trim panel member, and also extends longitudinally and vertically a predetermined distance, so that at least a portion of said first seam is covered by said reinforcement bracket, and said reinforcement bracket absorbs a force from an impact to said trim panel members to prevent separation of said first seam;
   wherein said reinforcement bracket includes an energy absorption aperture for absorbing energy applied to said reinforcement bracket.

9. The reinforced trim panel assembly as set forth in claim 8, wherein said energy absorbing aperture includes a longitudinally extending slot bisecting said energy absorbing aperture.

10. The reinforced trim panel as set forth in claim 8 wherein a fastening means is used to secure said reinforcement bracket to said first trim panel member and said second trim panel member.

11. A trim panel assembly attached to a body panel of a vehicle comprising:
   a first trim panel member that is generally planar and extends vertically and longitudinally a predetermined distance;
   a second trim panel member adjacent said first trim panel member along a first seam, and said second trim panel member is generally planar and extends vertically and longitudinally a predetermined distance;
   a third trim panel member adjacent a lower edge of said second trim panel member along a second seam, and said third trim panel member is generally planar and extends vertically and longitudinally a predetermined distance; and
   a reinforcement bracket disposed between said trim panel members and the vehicle body panels, and positioned over said first seam and said second seam, and secured to each of said first trim panel member, said second trim panel member, and said third trim panel member using a fastening means, wherein said reinforcement member is generally planar and has a shape corresponding to the shape of said first trim panel member, second trim panel member, and third trim panel member and also extends longitudinally and vertically a predetermined distance, so that at least a portion of said first seam and second seam is covered by said reinforcement member, and said reinforcement bracket absorbs a force from an impact to said trim panel members to prevent separation of said first seam or said second seam.

12. A trim panel assembly as set forth in claim 11 wherein said reinforcement bracket includes an energy absorption aperture for absorbing energy applied to said reinforcement bracket.

13. A trim panel assembly as set forth in claim 12, wherein said energy absorbing aperture includes a longitudinally extending slot bisecting said energy absorption aperture.

14. A trim panel as set forth in claim 11 wherein said fastening means is a screw.

* * * * *